United States Patent [19]

Bernatek

[11] Patent Number: 5,000,503

[45] Date of Patent: Mar. 19, 1991

[54] TAILGATE PROTECTOR

[75] Inventor: James D. Bernatek, Mt. Clemens, Mich.

[73] Assignee: Durakon Industries, Inc., Lapeer, Mich.

[21] Appl. No.: 455,670

[22] Filed: Dec. 22, 1989

[51] Int. Cl.⁵ ............................................. B60R 13/01
[52] U.S. Cl. .................................... 296/39.2; 296/57.1
[58] Field of Search ................... 296/39.1, 39.2, 199, 296/57.1; 105/423

[56] References Cited

U.S. PATENT DOCUMENTS

| | | | |
|---|---|---|---|
| 4,047,749 | 9/1977 | Lambitz et al. | 296/39.2 |
| 4,128,271 | 12/1978 | Gray | 296/39.2 |
| 4,333,678 | 6/1982 | Munoz et al. | 296/39.2 |
| 4,707,016 | 11/1987 | McDonald | 296/39.2 |
| 4,861,093 | 8/1989 | Chapman | 296/57.1 X |

Primary Examiner—Margaret A. Focarino
Assistant Examiner—Gary C. Hoge
Attorney, Agent, or Firm—Dykema Gossett

[57] ABSTRACT

A pick-up truck tailgate protective cover which protects the tailgate in a pick-up truck is fastened to the tailgate of a pick-up truck without drilling or perforating the tailgate. The tailgate protective cover is mounted to the pick-up truck tailgate by having one of its ends terminate in a hook-like end portion which is adapted to receive the top of the tailgate and another of its end portions employs a depending connector which cooperates with a fastening means and an existing tailgate aperture wherein the fastening means fastens the depending connector to the existing tailgate aperture.

4 Claims, 1 Drawing Sheet

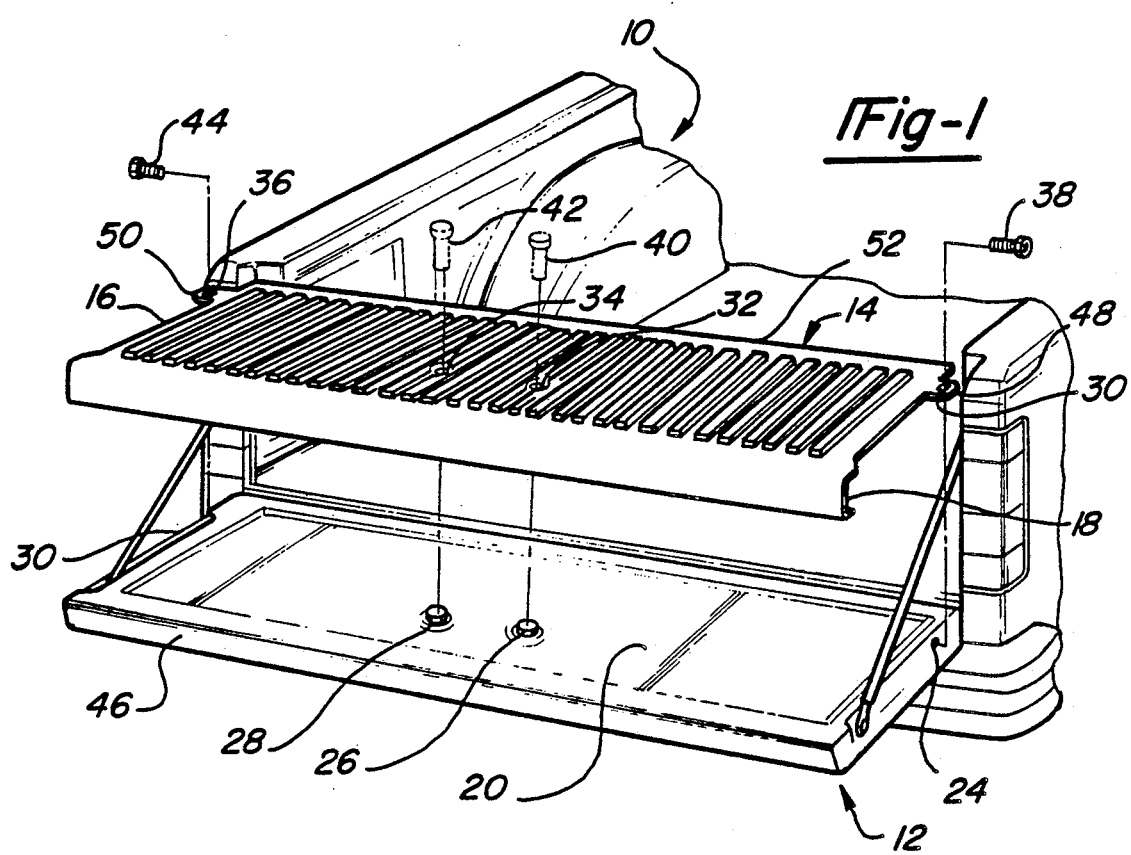
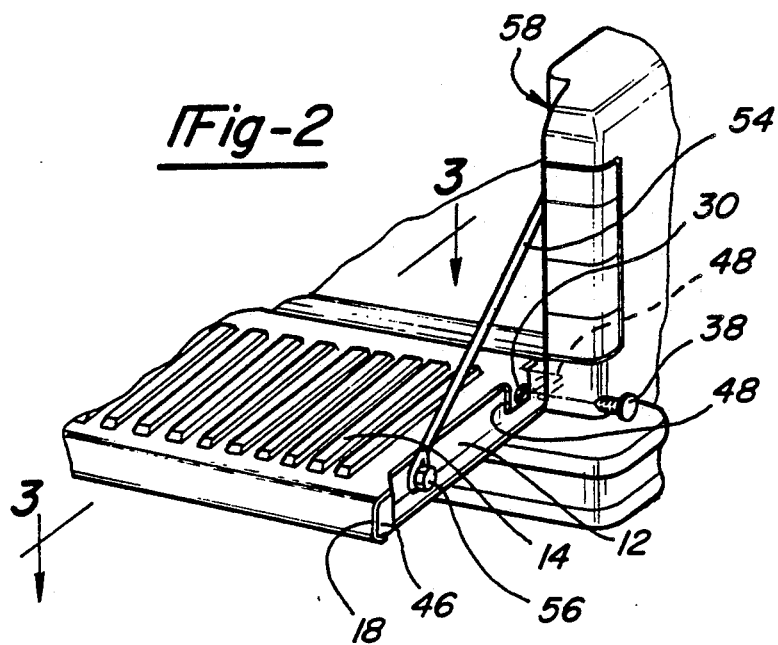
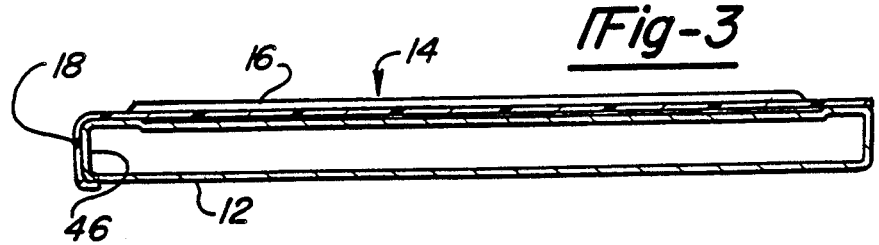

TAILGATE PROTECTOR

BACKGROUND OF THE INVENTION

The present invention relates generally to truck tailgate protectors and more specifically relates to truck tailgate protectors which fasten to a truck tailgate by taking advantage of existing tailgate apertures.

In recent years, pick-up trucks have become increasingly popular as a means for general-purpose hauling, as well as a means for general-purpose transportation. With the cost of vehicles in general, specifically pick-up trucks, increasing, many attempts have been made to increase the life of the pick-up truck's bed. These attempts have primarily focused on lining the pick-up truck cargo area with a preformed plastic liner, thereby eliminating direct contact between the bed and chemicals, abrasives and other destructive elements which tend to rust or otherwise shorten the life of the pick-up truck's bed.

Tailgate covers are commonly used in conjunction with truck bed liner. Tailgate covers prevent the tailgate from being scratched whenever cargo is slid into or out from the pick-up truck. Tailgate covers are generally made of the same material as the truck bed liner and are formed into the general shape of the inside panel of the tailgate. The most common method of installing the cover onto the tailgate is to drill several holes through the cover and tailgate assembly. A general-purpose fastener, such as a sheet metal screw, rivet, or plastic retainer is then inserted through the cover hole and respective tailgate hole to fasten the cover to the tailgate. These fasteners are typically placed along the top and bottom edges of the tailgate cover.

Although this method works satisfactorily in securing the cover to the tailgate, the fasteners which are placed along the top and bottom edges of the cover are normally visible and detract from the cover's appearance. Furthermore, unless a seal is provided between the top edge of the cover and the tailgate, water, abrasives, and other destructive elements can enter and accumulate between the two, thereby accelerating rusting and corrosive activity. Moreover, although tailgate covers prevent damage to the tailgate, mounting techniques which necessitate drilling holes in the tailgate introduce problems of their own. For example, drilling holes through the tailgate causes an aesthetically displeasing appearance of the pick-up tailgate should the tailgate liner ever be removed from the pick-up truck. Furthermore, by placing holes in the tailgate cover, paint, undercoating, plating and other protective coatings are removed, thus introducing the possibility that water, salt, and other destructive elements can enter and attack the bed metal causing premature corrosion. This destructive corrosion not only shortens the life of the tailgate, it also diminishes the overall vehicle value and may void certain aspects of the vehicle's warranty.

Accordingly, even with present tailgate liner constructions, there is a need for a tailgate liner that affixes to the tailgate without introducing any holes or other modifications which affect the tailgate integrity.

It is therefore a principal object of this invention to provide a tailgate liner which can protect the tailgate without introducing any perforations or holes into the truck tailgate.

Another object of the present invention is to provide a tailgate liner which prevents water, abrasives and other destructive elements from entering between the liner and the tailgate from along the top of the tailgate.

Still another object of the present invention is to provide a means of fastening a protective cover to a pick-up truck tailgate which is strong, durable, corrosion-resistant and inexpensive to manufacture.

SUMMARY OF THE INVENTION

In light of the foregoing objects, the present invention provides a protective cover adapted to be mounted to the tailgate of a pick-up truck, the tailgate having at least one aperture therein, the cover comprising: a main body portion adapted to substantially cover the cargo side of the tailgate, the main body Portion having a first depending connector element; and a first fastener means cooperating with the first depending connector element and a first tailgate aperture to secure the cover to the tailgate.

In a preferred embodiment, the cover's main body portion is comprised of opposing first and second ends, and the first end comprises a hook-shaped end portion adapted to fit snugly over the top of the tailgate, thereby securing the first end of the cover to the tailgate. In another embodiment of the preferred invention, the cover's main body portion is further comprised of opposing third and fourth ends, the first, second, third and fourth ends generally forming a rectangle.

Still, in another embodiment, the first depending element is located along the third end of the main body portion, and a second depending connector element is located along the fourth end of the main body portion. The second depending connector element cooperates with a second fastener means to secure the cover to the tailgate by way of a second tailgate aperture.

Yet in another preferred embodiment, the first and second depending connector elements are respectively located along the third and fourth ends in close proximity to the second end, thereby securing the second end of the cover to the tailgate.

These, together with other objects and advantages which will become subsequently apparent, reside in the details of construction and operation as more fully hereinafter described and claimed.

BRIEF DESCRIPTION OF THE DRAWINGS

FIG. 1 is an assembly view of a pick-up truck tailgate and a tailgate liner.

FIG. 2 is a partial perspective view of a pick-up truck tailgate with the tailgate liner in place.

FIG. 3 is a vertical sectional view of a tailgate fitted with a liner taken substantially along line 3—3 of FIG. 2.

DETAILED DESCRIPTION OF THE PREFERRED EMBODIMENTS

Referring now to the drawings. FIG. 1 depicts a conventional pick-up truck bed 10 and a tailgate 12. The tailgate 12 provides the primary means of accessing the contents of bed 10. Tailgate protective cover 14 is comprised of a main body portion 16 and a hook-shaped end portion 18. The protective cover 14 is designed to substantially cover the entire tailgate cargo surface 20.

Tailgate protector 14 fastens to tailgate 12 by utilizing tailgate 12 apertures which are placed in tailgate 12 during the manufacturing process. These factory-created apertures are shown at 24, 26, 28 and 30 (30 not visible). By using pre-existing apertures 24–30, the present invention does not need to rely upon aftermarket puncturing and drilling of the tailgate in order to mount protective cover 14. By utilizing pre-existing holes 24–30, no paint damage occurs to tailgate 12. Cover 14 is designed to cooperate with pre-existing tailgate apertures 24–30. This cooperation is accomplished by having its own apertures 30–36 placed in protective cover 14 such that these apertures 30–36 align with apertures 24–30. Fastening means 38–44 cooperate with their respective cover apertures 30–36 and their respective tailgate apertures 22–28 to fasten the cover 14 to tailgate 12. It is important to note that fastening means 38–44 are provided on tailgate 12 from the factory. For example, fastener 38 would typically be used in conjunction with mounting the tailgate hinge (not shown) to the bed portion of the pick-up. Likewise, the placement of fastener 40 on the tailgate 12 indicates that it is the type of fastener that is used in conjunction with mounting the locking mechanism (or some other internal workings of the tailgate which are not shown) employed by tailgate 12.

Protective cover 14 has a main body portion 16 which is terminated, along one end, in a hook-shaped end portion 18. This hook-shaped end portion 18 provides for two primary functions. First, by hooking around the top portion 46 of tailgate 12, it provides a means of fastening main body portion 16 to tailgate 12 along its hook-shaped end. Because hook-shaped portion 18 provides this fastening function, it is not necessary to provide additional fastening means on main body portion 16 along the hook-shaped end 18. Accordingly, the lack of pre-existing apertures in the tailgate 12 along top portion 46 does not pose an obstacle to the disclosed mounting technique. The second function provided by hook-shaped end portion 18 primarily resides in that it does not allow moisture, abrasives or any other type of undesirable debris to enter into the space provided between tailgate surface 20 and protective cover 14. If tailgate cover 14 were not provided with a hook-shaped end portion 18, but rather was merely terminated at this end, it would provide a lip which would collect moisture and other debris. Over time, this material would find its way between cover 14 and tailgate surface 20 and act as a catalyst for corrosion and oxidation.

It is also important to note that depending connectors 48, 50 are placed along their respective sides as far from hook-shaped end portion 18 as is feasible. This is done so as to provide maximum support to cover 14 along the side opposite from the hook-shaped end portion side 18. If depending connectors 48, 50 are placed too close to hook-shaped end portion 18, side 52 would not receive adequate retention force and accordingly may bow or curl away from tailgate surface 20, thereby interfering with cargo as it is slid off from bed 10.

Now referring to FIG. 2, tailgate protective cover 14 is shown mounted to tailgate 12. Hook-shaped end portion 18 is shown receiving top portion 46 of tailgate 12. This hook-shaped end portion receives top portion 46 and thereby prevents any pulling away of tailgate protective cover 14 from tailgate 12. Depending connector 48 is shown in two positions. The first position, shown in phantom lines, indicates depending connector 48 as it is oriented before it is mounted to tailgate 12. The second position depending connector 48 takes is when it is depressed downwardly so that its aperture 30 aligns with aperture 24 (aperture 24 not in view). Once apertures 30 and 24 are aligned, fastener 38 is driven through both apertures and is retained within the tailgate body (not shown). It is important to note that the location of depending connector 30 should not interfere with the operation of closing and opening tailgate 12. This is primarily because most conventional tailgates use a support strap 54 to limit the travel of tailgate 12. This support strap 34 is typically mounted to tailgate 12 by way of support anchor 56. Support strap 54 and support anchor 56 normally retract back and reside in a small opening which is provided for them between tailgate 12 and fender cut-out 58. Because fender cut-out 58 exists, it typically provides ample clearance for the additional room taken up by depending connector 48.

Now referring to FIG. 3, a cross-section of tailgate 12 is shown having mounted to it tailgate protector 14 as comprised of main body portion 16 and hook-shaped end portion 18. It is important to note the manner in which hook-shaped end portion 18 completely receives the top portion 46 of tailgate 12. By completely receiving the top portion 46 of tailgate 12, hooked end portion 18 acts as a means for retaining tailgate protector 14 along the entire length of its top end. Conspicuous by their absence is the lack of any fasteners which pierce through tailgate cover 14 and into tailgate 12. Conventional fastening techniques would show a plurality of fasteners piercing through both protective cover 14 and tailgate 12. Because of the mounting techniques disclosed herein, existing tailgate apertures and fasteners can be utilized for mounting the protective cover 14 to tailgate 12, and accordingly, no new apertures need to be added.

The foregoing detailed description shows that the preferred embodiments of the present invention are well-suited to fulfill the objects stated. It is recognized that those skilled in the art may make various modifications or additions to the preferred embodiments chosen here to illustrate the present invention, without departing from the spirit of the present invention. For example, the depending connectors 48, 50 are shown to be extensions of the same material which makes up the tailgate protective cover 14. It is contemplated that these depending connectors could be made from any number of materials different from the materials used to make the liner. From a cost and manufacturing standpoint, there are many advantages to making the depending connectors 48, 50 from the same material that is used to make the protective cover 14 inasmuch as this manufacturing technique eliminates extraneous assembly steps associated with affixing depending connectors to the tailgate cover. Moreover, the placement of depending connectors 48, 50 can be moved to side 52, provided there are existing tailgate apertures in the corresponding locations of tailgate 12. Such apertures may exist in some tailgate designs in that this downward portion of tailgate 12 is often used to pass electrical wiring, provide moisture drainage holes, and mount tailgate hinges (not shown) to bed portion 10. It is also contemplated that fastening means 38 can be comprised of springs, clips, plastic push-in fasteners or the like to accomplish the fastening of protector 14 to tailgate 12. Accordingly, it is to be understood that the protection sought to be afforded hereby should be deemed to extend to the subject matter defined in the appended claims including all fair equivalents thereof.

I claim:

1. A protective cover adapted to be mounted to the tailgate of a pick-up truck, said tailgate having at least a first factory-created aperture therein, said cover comprising:

a main body portion adapted to substantially cover the cargo side of said tailgate, said main body portion having a first depending connector element;

a first fastener means cooperating with said first depending connector element and said first tailgate aperture to secure said cover to said tailgate;

wherein said main body portion is comprised of opposing first and second ends and said first end comprises a hook-shaped end portion adapted to fit snugly over the top of said tailgate, thereby securing said first end of said cover to said tailgate;

wherein said main body portion is further comprised of opposing third and fourth ends, said first, second, third and fourth ends generally forming a rectangle; and wherein said first depending connector element is located along one of said third and fourth ends of said main body portion.

2. The cover of claim 1, further comprising a second depending connector element located along the other of said third and fourth ends of said main body portion, and a second fastener means cooperating with said second depending connector element and a second factory-created tailgate aperture to secure said cover to said tailgate.

3. The cover of claim 2, wherein said first and second depending connector elements are respectively located along said third and fourth ends in close proximity to said second end, thereby securing said second end of said cover to said tailgate.

4. A method of fastening a protective tailgate cover to the tailgate of a pick-up truck, said cover of the type having a main body portion adapted to substantially cover the cargo side of said tailgate wherein said cover has at least one depending connector element, comprising the steps of:

locating the depending connector along one edge of said cover in close proximity to a factory-created tailgate aperture; and fastening said depending connector to said tailgate by using a fastener to cooperate with the depending connector and the factory-installed aperture.

* * * * *